(12) United States Patent
Hayakawa et al.

(10) Patent No.: US 12,615,272 B2
(45) Date of Patent: *Apr. 28, 2026

(54) LOG DETERMINATION DEVICE, LOG DETERMINATION METHOD, LOG DETERMINATION PROGRAM, AND LOG DETERMINATION SYSTEM

(71) Applicant: DENSO CORPORATION, Kariya-city (JP)

(72) Inventors: Keita Hayakawa, Kariya-city (JP); Tomonori Ikuse, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 189 days.

This patent is subject to a terminal disclaimer.

(21) Appl. No.: 18/473,355

(22) Filed: Sep. 25, 2023

(65) Prior Publication Data

US 2024/0114044 A1     Apr. 4, 2024

(30) Foreign Application Priority Data

Sep. 30, 2022     (JP) ................................. 2022-157428

(51) Int. Cl.
H04L 9/40          (2022.01)

(52) U.S. Cl.
CPC ...... H04L 63/1425 (2013.01); H04L 63/1433 (2013.01); H04L 63/20 (2013.01)

(58) Field of Classification Search
None
See application file for complete search history.

(56) References Cited

U.S. PATENT DOCUMENTS

| | | | | |
|---|---|---|---|---|
| 8,737,426 | B1 * | 5/2014 | Fredriksson | .............. H04J 3/07 370/464 |
| 10,369,942 | B2 * | 8/2019 | Ben Noon | ............ G06F 21/606 |
| 11,973,769 | B1 * | 4/2024 | Le | ........................ H04L 63/1425 |

(Continued)

FOREIGN PATENT DOCUMENTS

| | | | |
|---|---|---|---|
| JP | 2021-083125 A | 5/2021 |
| JP | 2021-141507 A | 9/2021 |

(Continued)

OTHER PUBLICATIONS

Larson, et al.; An Approach to Specification-based Attack Detection for In-Vehicle Networks; IEEE (Year: 2008).*

(Continued)

*Primary Examiner* — Kambiz Zand
*Assistant Examiner* — Mahabub S Ahmed
(74) *Attorney, Agent, or Firm* — Harness, Dickey & Pierce, P.L.C.

(57)          ABSTRACT

A log determination acquires a set of security logs each generated upon detecting an abnormality in an electronic control system mounted on a vehicle, specifies a specific security log based on abnormality type information, specifies a frequency of generation of the specific security log, determines whether or not the specific security log is a false positive log, generates false positive log information, and outputs the generated false positive log information to analyze an attack on the electronic control system and to take a countermeasure against the attack based on the analyzing.

13 Claims, 11 Drawing Sheets

(56) References Cited

U.S. PATENT DOCUMENTS

| | | | | |
|---|---|---|---|---|
| 2016/0188396 A1* | 6/2016 | Sonalker | | G06F 11/079 |
| | | | | 714/37 |
| 2017/0013005 A1* | 1/2017 | Galula | | H04L 63/1425 |
| 2017/0286675 A1* | 10/2017 | Shin | | H04L 63/1416 |
| 2017/0341605 A1* | 11/2017 | Ben Noon | | H04L 12/4625 |
| 2018/0091533 A1* | 3/2018 | Yajima | | H04L 12/40 |
| 2018/0241584 A1* | 8/2018 | Ruvio | | H04L 12/40013 |
| 2018/0300477 A1* | 10/2018 | Galula | | H04L 63/1416 |
| 2018/0316710 A1* | 11/2018 | Fujiwara | | H04W 12/122 |
| 2018/0351980 A1* | 12/2018 | Galula | | H04L 63/1425 |
| 2018/0367554 A1* | 12/2018 | Allouche | | G06F 21/554 |
| 2019/0081960 A1* | 3/2019 | Kupfer | | H04L 63/1416 |
| 2019/0081966 A1* | 3/2019 | Ploucha | | H04L 63/1425 |
| 2019/0173902 A1* | 6/2019 | Takahashi | | G06N 99/00 |
| 2019/0173912 A1* | 6/2019 | Ujiie | | H04L 12/40 |
| 2019/0245872 A1* | 8/2019 | Shin | | H04L 63/1425 |
| 2019/0258953 A1* | 8/2019 | Lang | | G06N 3/045 |
| 2019/0260772 A1* | 8/2019 | Juliato | | H04L 63/1416 |
| 2019/0312892 A1* | 10/2019 | Chung | | G06F 21/554 |
| 2019/0367041 A1* | 12/2019 | Nakano | | G06F 21/554 |
| 2019/0385057 A1* | 12/2019 | Litichever | | G06N 3/08 |
| 2020/0067955 A1* | 2/2020 | Hass | | H04L 12/40013 |
| 2020/0117262 A1* | 4/2020 | Park | | H04L 12/40039 |
| 2020/0143053 A1* | 5/2020 | Gutierrez | | G06F 21/554 |
| 2020/0145433 A1* | 5/2020 | Gutierrez | | G06N 3/0985 |
| 2020/0183373 A1* | 6/2020 | Choi | | G05B 23/024 |
| 2020/0226274 A1* | 7/2020 | Juliato | | G06F 21/62 |
| 2020/0284883 A1* | 9/2020 | Ferreira | | G01S 7/4815 |
| 2020/0285997 A1* | 9/2020 | Bhattacharyya | | G06N 7/01 |
| 2020/0294401 A1* | 9/2020 | Kerecsen | | G08G 1/205 |
| 2021/0029147 A1* | 1/2021 | McCanty | | H04W 12/009 |
| 2021/0075800 A1* | 3/2021 | Paraskevas | | H04L 63/1441 |
| 2021/0099469 A1* | 4/2021 | Zeh | | H04L 63/1466 |
| 2021/0114606 A1* | 4/2021 | Alvarez | | B60W 60/00188 |
| 2021/0176259 A1* | 6/2021 | Park | | H04L 63/1408 |
| 2021/0192867 A1* | 6/2021 | Fang | | G07C 5/0816 |
| 2021/0258327 A1* | 8/2021 | Felke | | H04L 63/1425 |
| 2021/0258328 A1* | 8/2021 | Appel | | H04L 67/12 |
| 2021/0281594 A1* | 9/2021 | Mizunuma | | H04L 63/1441 |
| 2021/0300432 A1 | 9/2021 | Fukuzawa et al. | | |
| 2021/0392109 A1* | 12/2021 | Hamada | | H04L 63/1425 |
| 2022/0001835 A1* | 1/2022 | Kim | | B60R 25/00 |
| 2022/0017041 A1 | 1/2022 | Imoto et al. | | |
| 2022/0100601 A1* | 3/2022 | Baum | | G06F 11/1004 |
| 2022/0114560 A1* | 4/2022 | Senzer | | G07C 5/085 |
| 2022/0171697 A1* | 6/2022 | Moukahal | | G06F 11/3684 |
| 2022/0182404 A1* | 6/2022 | Kishikawa | | H04L 63/1416 |
| 2022/0188414 A1* | 6/2022 | Davidovich | | H04W 12/121 |
| 2022/0242419 A1* | 8/2022 | Davidovich | | B60W 40/105 |
| 2022/0309153 A1 | 9/2022 | Nagara et al. | | |
| 2022/0377094 A1* | 11/2022 | Islam | | H04L 63/1425 |
| 2022/0400125 A1* | 12/2022 | Mendelowitz | | G06N 3/08 |
| 2022/0407874 A1* | 12/2022 | Joo | | H04L 12/12 |
| 2023/0109507 A1* | 4/2023 | Kim | | B60R 25/30 |
| | | | | 726/25 |
| 2023/0267782 A1* | 8/2023 | Ucar | | G07C 5/085 |
| | | | | 701/31.7 |
| 2023/0283617 A1* | 9/2023 | Tasaki | | G06F 21/55 |
| | | | | 726/22 |
| 2023/0379344 A1 | 11/2023 | Chiba | | |
| 2024/0007286 A1* | 1/2024 | Miyamoto | | H04L 9/088 |
| 2024/0045970 A1* | 2/2024 | Morita | | G06F 21/554 |
| 2024/0067216 A1* | 2/2024 | Gokhale | | B60W 50/0097 |
| 2024/0364727 A1* | 10/2024 | Adachi | | H04L 12/40 |
| 2025/0156533 A1* | 5/2025 | Wada | | G06F 21/55 |

FOREIGN PATENT DOCUMENTS

| | | |
|---|---|---|
| JP | 2021-157338 A | 10/2021 |
| JP | 2022-017873 A | 1/2022 |
| JP | 2022-131504 A | 9/2022 |
| JP | 2022-153081 A | 10/2022 |

OTHER PUBLICATIONS

Tomlinson; Detecting Cyber Attacks on the Automotive Controller Area Network; Coventry University—A thesis submitted in partial fulfilment of the University's requirements for the Degree of Doctor of Philosophy (Year: 2019).*

Tanksale; Anomaly Detection for Controller Area Networks Using Long Short-Term Memory; from google scholar (Year: 2020).*

Nowdehi et al.; CASAD: CAN-Aware Stealthy-Attack Detection for In-Vehicle Networks; from google (Year: 2019).*

Kalutarage et al.; Context-aware Anomaly Detector for Monitoring Cyber Attacks on Automotive CAN Bus; from google (Year: 2019).*

Tomlinson et al.; Detection of Automotive CAN Cyber-Attacks by Identifying Packet Timing Anomalies in Time Windows; IEEE ( Year: 2018).*

Cho et al.; Fingerprinting Electronic Control Units for Vehicle Intrusion Detection; 25th USENIX Security Symposium (Year: 2016).*

* cited by examiner

| HEADER |
|---|
| ECU ID |
| SENSOR ID |
| EVENT ID |
| COUNTER |
| TIMESTAMP |
| CONTEXT DATA |

FIG. 5

| EVENT ID | REFERENCE FREQUENCY | |
| --- | --- | --- |
| | PERIOD [SEC] | TIMES |
| A | 10 | 3 |
| B | 20 | 5 |
| C | 20 | 3 |
| ⋮ | | |

10s

☐ : SECURITY LOG (EVENT ID=A)

10s

☐ : SECURITY LOG (EVENT ID=A)

START

S101 — ACQUIRE SECURITY LOG

S102 — DETERMINATION OF FALSE POSITIVE LOG

S103 — FALSE POSITIVE LOG?     NO

YES

S104 — ADD FALSE POSITIVE INFO

S105 — ACQUIRE FREQUENCY INFO

S106 — UPDATE REFERENCE FREQUENCY

S107 — TRANSMIT SECURITY LOG

END

FIG. 9

| EVENT ID | SUCCESS EVENT ID | REFERENCE FREQUENCY | |
| --- | --- | --- | --- |
| | | PERIOD [SEC] | TIMES |
| A | D | 10 | 3 |
| B | — | 20 | 5 |
| C | E | 20 | 3 |
| ⋮ | ⋮ | | |

▦ : ABNORMALITY SECURITY LOG (EVENT ID=A)

☐ : SUCCESS SECURITY LOG (EVENT ID=D)

LOG DETERMINATION DEVICE, LOG DETERMINATION METHOD, LOG DETERMINATION PROGRAM, AND LOG DETERMINATION SYSTEM

CROSS REFERENCE TO RELATED APPLICATION

This application is based on Japanese Patent Application No. 2022-157428 filed on Sep. 30, 2022, the disclosure of which is incorporated herein by reference.

TECHNICAL FIELD

The present disclosure relates to a log determination device, a log determination method, a log determination program, and a log determination system, which are devices for determining a security log.

BACKGROUND

A related art discloses a device that prevents intrusion of unauthorized information by determining, when an electronic control unit detects an abnormality, a measure for blocking the unauthorized information by using a determination result as to whether a protection function or a function other than the protection function installed in the electronic control unit is normal or abnormal.

SUMMARY

According to an example, a log determination device may acquire a security log and determine whether the detected security log corresponds to a false positive log based on a frequency of generation of the security log.

BRIEF DESCRIPTION OF DRAWINGS

Objects, features and advantages of the present disclosure will become more apparent from the following detailed description made with reference to the accompanying drawings. In the drawings:

FIG. 5 is a diagram illustrating a table stored in a storage unit according to the first embodiment;

FIG. 9 is a diagram illustrating a table stored in a storage unit according to a second embodiment;

DETAILED DESCRIPTION

Figure 1A:
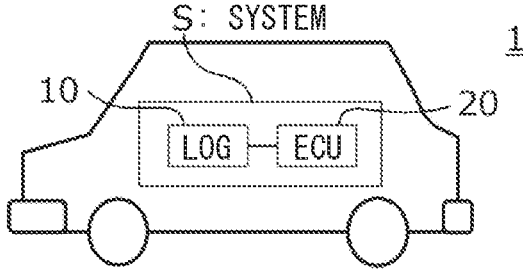
FIG. 1A is an explanatory diagram illustrating an arrangement of a log determination analysis device and an electronic control device system.

In recent years, technologies for driving support and automated driving control, including V2X such as vehicle-to-vehicle communication and road-to-vehicle communication, have been attracting attention. Vehicles have come to be equipped with a communication function, and vehicles are becoming more connected. A probability that a vehicle may receive a cyberattack such as unauthorized access may be increasing. Therefore, it may be required to analyze a cyber-attack on a vehicle and take a countermeasure against the cyberattack.

As a result of detailed consideration by the present inventors, the inventors have found the following.

The abnormality that occurs in the vehicle includes not only an abnormality that occurs due to a cyberattack but also an abnormality that occurs for a reason other than the cyberattack. For example, when the user of the vehicle performs some erroneous operation, a sensor may determine non-execution of a normal process as an abnormality and generate a log. Therefore, there may be a possibility that the collected logs include not only a log related to an abnormality caused by a cyberattack but also a log related to the abnormality caused by such a user's erroneous operation (may also be referred to as an erroneous operation by a user). The log related to the abnormality caused not by a cyber-attack but by others (e.g., user's erroneous operation) is false positive. When the analysis of the cyberattack is performed in a state in which such logs are mixed, the analysis accuracy may decrease.

The present disclosure describes a technique to determine whether or not a log generated by a sensor is a log related to an abnormality that has occurred for a reason other than a cyberattack, in particular, an abnormality that has occurred due to an erroneous operation by a user.

According to one aspect of the present disclosure, a log determination device may comprise: a log acquisition unit that is configured to acquire a security log generated upon detecting an abnormality in an electronic control system; and a false positive log determination unit that is configured to determine, based on a frequency of generation of the security log, whether or not the detected security log is a false positive log, and to output a determination result, wherein the false positive log is the security log generated by detecting the abnormality caused not by the electronic control system being attacked.

According to the described configuration, it may be possible to determine whether or not the log generated by the sensor is a log related to an abnormality caused by an erroneous operation of the user. It may be possible to improve the analysis accuracy of the cyberattack by analyzing the cyberattack in consideration of the determination result.

Hereinafter, embodiments of the present disclosure will be described with reference to the drawings.

When there are multiple embodiments, the configurations disclosed in the embodiments are not limited to the embodiments and can be combined across the embodiments. For example, a configuration disclosed in one embodiment may be combined with other embodiments. The disclosed configurations in respective multiple embodiments may be partially combined.

(Configuration Based on Embodiments)
(Overview of a Log Determination System 1)

Figure 1B:
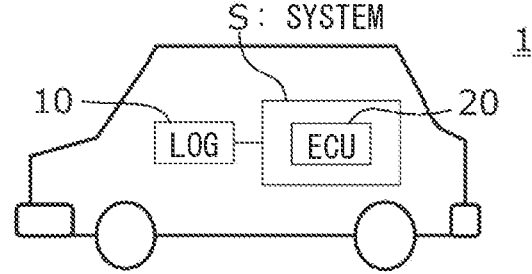
FIG. 1B is an explanatory diagram illustrating an arrangement of a log determination analysis device and an electronic control device system.
Figure 1C:
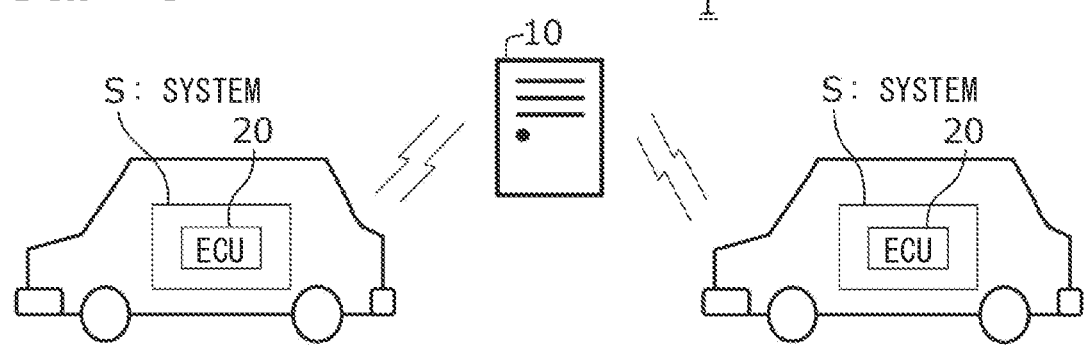
FIG. 1C is an explanatory diagram illustrating an arrangement of a log determination analysis device and an electronic control device system.

A log determination system 1 is a system including a log determination device 10 and an electronic control device 20 configuring an electronic control system S. The arrangement of the log determination device 10 of each embodiment configuring the log determination system 1 will be described with reference to FIG. 1A to FIG. 1C. For example, as illustrated in FIG. 1A and FIG. 1B, it is assumed that the log determination device 10 is "mounted" on a vehicle which is a "movable object" together with the electronic control device 20 configuring the electronic control system S. As illustrated in FIG. 1C, it is assumed that the electronic control device 20 configuring the electronic control system S is "mounted" on a vehicle which is a "movable object" and the log determination device 10 is realized by a server device, a security operation center (SOC), or the like provided outside the vehicle.

The movable object means an object that can move, and the moving speed of the movable object is not particularly restricted. In addition, a case in which the movable object is stopped is also included. Examples of the movable object include automobiles, motorcycles, bicycles, pedestrians, ships, aircrafts, and objects mounted thereon. However, the movable object is not limited to these features.

Further, the term "mounted" includes not only a case where an object is directly fixed to the movable object but also a case where an object is moved together with the movable object although the object is not fixed to the movable object. For example, the term "mounted" also includes a case where a person who is on board the movable object carries, or a case where being mounted on a luggage loaded on the movable object.

In the example illustrated in FIG. 1A, the log determination system 1 may be referred to be an electronic control system S. In the example illustrated in FIG. 1C, the log determination system 1 is a system including a log determination device 10 provided outside a vehicle and an ECU configuring each electronic control system S mounted on multiple vehicles.

The log determination device 10 is a device that acquires a security log from multiple electronic control units (ECUs) and determines the log.

Here, the "electronic control unit" may be not only a physically independent electronic control unit but also a virtual electronic control unit realized by using a virtualization technology.

Figures 2, 3:
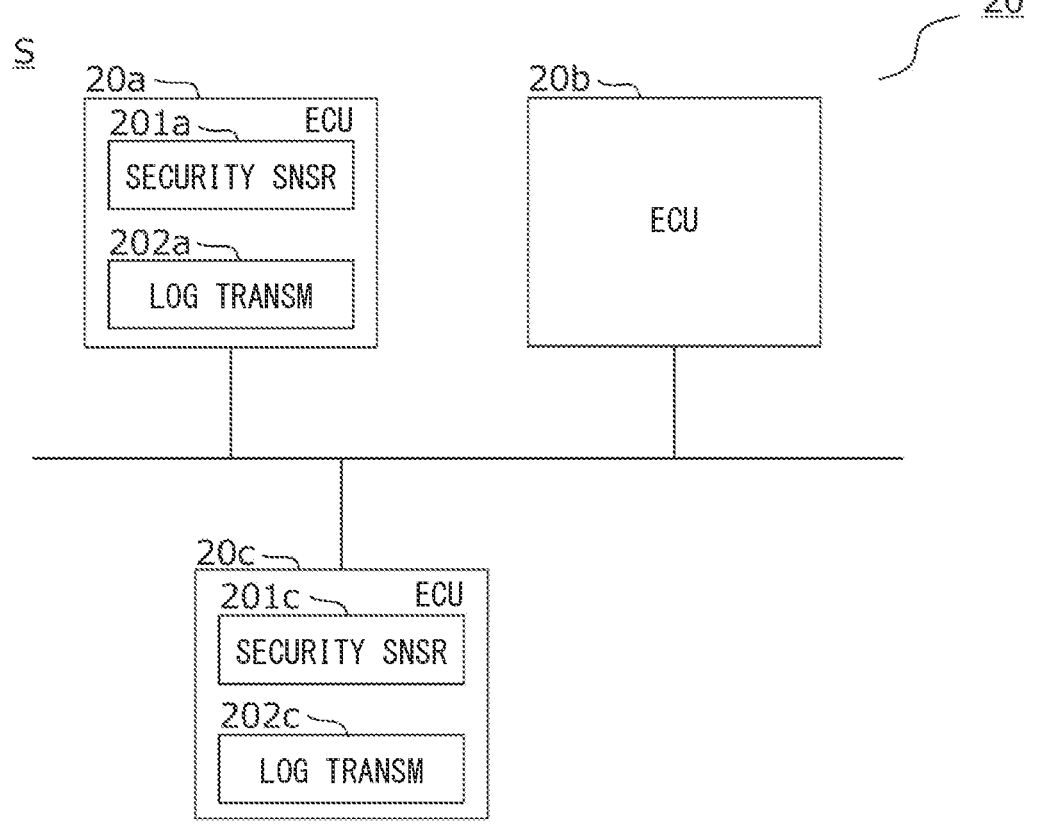
FIG. 2 is an explanatory diagram illustrating a configuration of an electronic control system and an electronic control device according to each embodiment.
FIG. 3 is an explanatory diagram illustrating a security log generated by a security sensor of an electronic control device according to each embodiment.

FIG. 2 is a diagram showing a configuration example of the electronic control system S. The electronic control system S includes multiple ECUs 20. FIG. 2 exemplifies three ECUs (ECUs 20a, 20b, and 20c). However, the electronic control system S may include any number of ECUs. In the following description, when a single or multiple electronic control units are collectively described, they are referred to as the ECU 20 and each ECU 20. When the individual electronic control units are specified and described, they are referred to as the ECU 20a, the ECU 20b, and the ECU 20c.

In the electronic control system S of FIG. 2, the ECU 20a and the ECU 20c each include a security sensor 201 (201a, 201c). By contrast, no security sensor is mounted on the ECU 20b. As described above, the security sensor may be mounted on the multiple ECUs 20 configuring the electronic control system S. It may be unnecessary to mount the security sensor in all the ECUs 20. The ECUs 20a, 20c further include a log transmission unit 202 (202a, 202c).

The security sensor 201 (corresponding to a log generation unit) generates a security log when detecting an abnormality occurring in the ECU 20 or a network connected to the ECU 20.

The log transmission unit 202 "transmits" the security log generated by the security sensor 201 to the log determination device.

Here, "transmitting" may be transmitted using either wired communication or wireless communication. Transmission using wireless communication also includes transmission via a device having a communication function.

In each embodiment described below, a case where the security log is a log generated by the security sensor 201 illustrated in FIG. 2 will be described as an example. However, the security log in the present disclosure may be a log generated by a function of collecting and managing information related to an event that has occurred in the electronic control system, which is called an in-vehicle SIEM (Security Information and Event Management).

The electronic control system S can be configured by any ECU. Examples of the ECU include a drive system electronic control unit that controls an engine, a steering wheel, a brake, and the like, a vehicle body system electronic control unit that controls a meter, a power window, and the like, an information system electronic control unit such as a navigation device, and a safety control system electronic control unit that performs control for preventing a collision with an obstacle or a pedestrian. The ECUs may be in parallel relationship with each other. Alternatively, the ECUs may be classified as masters and slaves. The electronic control system S may be provided with a gateway ECU or a central ECU (C-ECU) that connects the electronic control units to each other, and an external communication ECU that communicates with the outside of the vehicle. For example, the ECU 20a may be an external communication ECU, and the ECUc may be a C-ECU.

Further, the ECU 20 may be a physically independent ECU. The ECU 20 may be a virtual ECU (may be referred to as a virtual machine) that is virtually realized.

In the case of FIG. 1A and FIG. 1B, the log determination device 10 and each ECU 20 are connected via an in-vehicle communication network such as a controller area network (CAN) or a local interconnect network (LIN). Alternatively, the log determination device 10 and each ECU 20 may be connected via any communication method, whether wired or wireless, such as Ethernet (registered trademark), Wi-Fi (registered trademark), or Bluetooth (registered trademark). The connection refers to a state in which data can be exchanged and refers to a case in which different pieces of hardware are connected via a wired or wireless communication network. Furthermore, the connection also includes a case where virtual machines realized on the same hardware are virtually connected to each other.

FIG. 1A illustrates a log determination device 10 is independently provided inside the electronic control system S, or a function of the log determination device 10 is incorporated in at least one of the ECUs 20 configuring the electronic control system S, for example, a C-ECU or an external communication ECU.

FIG. 1B is a diagram in which the log determination device 10 is provided outside the electronic control system S. FIG. 1B is substantially the same as FIG. 1A from the viewpoint of the form of connection.

FIG. 1C is a diagram in which the log determination device 10 is provided outside the electronic control system S. Since the log determination device 10 of FIG. 1C is provided outside the vehicle, the form of connection is different from that of FIG. 1A and FIG. 1B. The log determination device 10 and the electronic control system S are connected via a communication network such as a wireless communication system such as IEEE 802.11 (Wi-Fi (registered trademark)), IEEE 802.16 (WiMAX (registered trademark)), W-CDMA (Wideband Code Division Multiple Access), HSPA (High Speed Packet Access), LTE (Long Term Evolution), LTE-A (Long Term Evolution Advanced), 4G, or 5G. Alternatively, dedicated short range communication (DSRC) may be used. When the vehicle is parked in a parking lot or housed in a repair shop, a wired communication system may be used instead of a wireless communication system. For example, a local area network (LAN), the Internet, or a fixed telephone line may be used. Incidentally, even when the vehicle is parked in a parking lot or housed in a repair shop, the log determination device 10 and the electronic control system S may be connected via a wireless communication system.

In the case of FIG. 1C, one ECU (for example, the ECU 20_a_) among the ECUs 20 aggregates security logs generated by the security sensor 201 of each ECU 20, and collectively transmits the aggregated security logs to the log determination device 10. The ECU 20_a_ in this case corresponds to an intrusion detection system reporter (IDSR) of a specification defined by an automatic open system architecture (AUTOSAR). Alternatively, the ECU 20_a_ may sequentially transmit the security log generated by the security sensor of each ECU 20 to the log determination device 10.

In the case of FIG. 1A and FIG. 1B, the log determination process is performed in the vehicle. It may be possible to transmit only a security log that is not determined to be a false positive log to a server device or the like provided outside the vehicle. In other words, a false positive log is not transmitted to the server or the like. Therefore, it may be possible to reduce the amount of communication between the vehicle and the server device. Further, since the server device may analyze only the security log other than the received false positive log, it may be possible to suppress the log analysis process in the server device.

In the case of FIG. 1C, the log determination process can be executed using the abundant resources of the server apparatus. Further, it may be possible to implement the log determination process of each embodiment without installing a new device or a new program in an existing vehicle.

In the following embodiments, the case of the arrangement shown in FIG. 1C will be described as an example.

In each embodiment, the electronic control system S will be described with an example that the electronic control system S corresponds to an in-vehicle system installed in a vehicle. The electronic control system S is not limited to an in-vehicle system but may be applied to any electronic control system configured by multiple ECUs. For example, the electronic control system S may be mounted on a stationary object instead of a movable object.

Although not illustrated in FIG. 1A and FIG. 1B, the log determination device 10 may be further connected to an attack analysis device (not illustrated) that analyzes a security log determined by the log determination device 10 and analyzes a cyberattack performed on a vehicle. Alternatively, each function of the log determination device 10 to be described later may indicate a function incorporated in the attack analysis device. Hereinafter, the cyberattack may be simply referred to as an attack.

(Details of a Security Log)

FIG. 3 is a diagram illustrating contents of a security log generated by the security sensor of the ECU 20.

The security log includes fields of an ECU-ID (corresponding to "device ID") indicating identification information of an ECU on which the security sensor is mounted, a sensor ID indicating identification information of the security sensor, an event ID (corresponding to "event type information") indicating identification information of an event related to an abnormality detected by the security sensor, a counter indicating the number of occurrences of the event, a time stamp indicating an occurrence time of the event, and context data indicating details of an output of the security sensor. The security log may further include a header storing information indicating the version of a protocol and the state of each field.

According to the specification defined by AUTOSAR, IdsM Instance ID corresponds to an ECU-ID, Sensor Instance ID corresponds to the sensor ID, Event Definition ID corresponds to the event ID, Count corresponds to the counter, Timestamp corresponds to the timestamp, Context Data corresponds to the context data, and Protocol Version or Protocol Header corresponds to the header.

FIG. 3 is an example of the log generated when an abnormality occurs. The normal log generated when no abnormality occurs (for example, a case where an event is successful) may have the same specifications as in FIG. 3. In such cases, for example, different event IDs may be used for an abnormal event and a successful event to distinguish between abnormal and normal logs. By setting a flag indicating the presence or absence of context data in the header, the abnormal log may be distinguished from the normal log by checking the flag.

FIG. 3 shows a security log generated by the ECU 20 that is physically independent. The security log may be generated by a virtual ECU.

First Embodiment (Configuration of the Log Determination Device 10)

Figure 4:
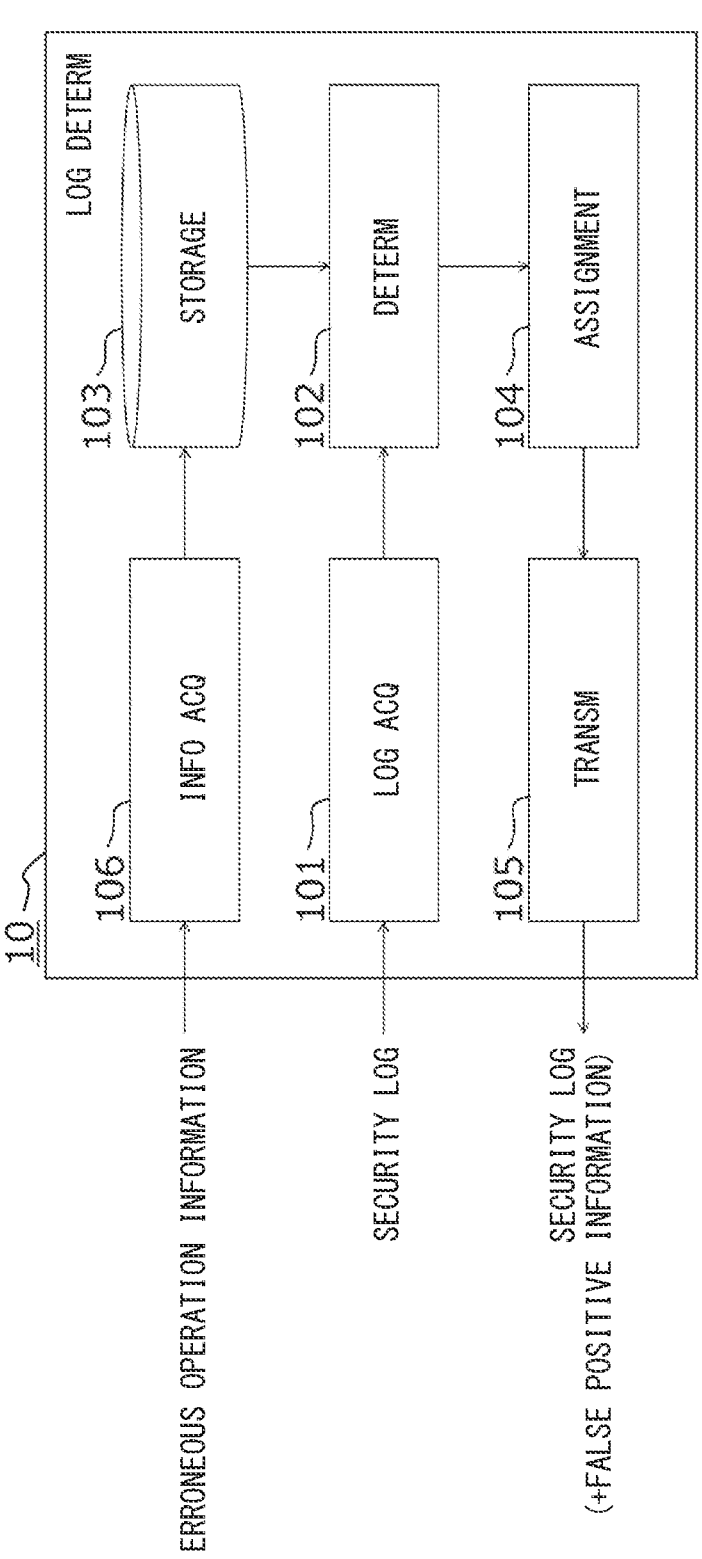
FIG. 4 is a block diagram illustrating a configuration example of a log determination device according to each embodiment.

FIG. 4 is a block diagram showing the configuration of the log determination device 10 in the present embodiment. The log determination device 10 includes a log acquisition unit 101, a false positive log determination unit 102, a storage unit 103, a false positive information assignment unit 104, a transmission unit 105, and an erroneous operation frequency information acquisition unit 106.

The log acquisition unit 101 acquires a security log generated by the security sensor 201 mounted on the ECU 20. The configuration of the electronic control system S is as described in FIG. 2. The contents of the security log are as described in FIG. 3.

When the log determination device 10 adopts the arrangement illustrated in FIG. 1C for the electronic control system S, the log acquisition unit 101 acquires the security log by receiving it via a communication network with a wireless communication method. The log acquisition unit 101 may collectively acquire multiple aggregated security logs. Alternatively, the log acquisition unit 101 may acquire the generated security logs sequentially. When the log acquisition unit 101 sequentially acquires the generated security logs, the log determination device 10 may further be equipped with a log storage unit (not shown) that temporarily stores a security log acquired by the log acquisition unit 101.

The false positive log determination unit 102 determines, based on the "frequency" at which the security log was generated, whether or not the security log obtained by the log acquisition unit 101 is a false positive log. The false positive log determination unit 102 output a determination result. Incidentally, the false positive log means a security log generated by detecting an abnormality that is different from an abnormality caused by an attack on the electronic control system S. In the present disclosure, the false positive log determination unit 102 determines a false positive log generated by a security sensor detecting an abnormality caused by an erroneous operation by a user of the electronic control system, as an abnormality different from an abnormality caused by an attack. As shown in FIG. 3, the security log has the time when the event occurred. Therefore, the false positive log determination unit 102 can specify the frequency with which security logs are generated, based on the time stamp possessed by the security log.

Here, "frequency" is indicated by, for example, the number of times, the time, the period, or the like at which the security log is generated.

In the block diagram shown in FIG. 4, the false positive log determination unit 102 illustrates a configuration in which the determination result is output to the false positive information assignment unit 104. The false positive log determination unit 102 may output the determination result to a memory (not shown) such as RAM (Random Access Memory), for example.

The false positive log determination unit 102 refers information stored in the storage unit 103 in the false positive log determination process. The storage unit 103 is a storage unit that stores information used for determining of a false positive log. FIG. 5 is a diagram showing an example of information stored in the storage unit 103. The storage unit 103 shown in FIG. 5 stores a table indicating a correspondence between event IDs and reference frequencies, which will be described later.

The event ID stored in the storage unit 103 is an event ID that indicates the identification information of an event related to an abnormality that may be caused by an erroneous operation (maloperation) by the user of the electronic control system S. The event ID stored in the storage unit 103 may be referred to as a stored event ID.

The above event ID indicating the identification information of the event related to an abnormality that may be caused by an erroneous operation corresponds to an erroneous operation event type information.

Here, the term "user" includes not only the owner of the electronic control system but also those who temporarily use the electronic control system.

The reference frequency stored in the storage unit 103 is a frequency to be the reference for determining whether or not the security log is a false positive log. In the example shown in FIG. 5, time and number of times are stored as the reference frequency, but the present disclosure is not limited to these.

For example, it is assumed that an erroneous operation occurs since a user of a vehicle equipped with the electronic control system S incorrectly enters a password necessary for connecting to Wi-Fi (registered trademark) or that an operator at a maintenance shop or dealer performs an incorrect authentication operation. When such erroneous operations are performed, the security sensor 201 detects an abnormality caused by these erroneous operations and generates a security log. In another example, it is assumed that updating the software installed in the ECU 20, a worker at a maintenance shop or a dealer makes a mistake such as making a mistake in selection of the program or terminating the work before the update of all the software is completed. When such erroneous operations are performed, the security sensor 201 detects abnormality caused by these erroneous operations and generates a security log. Events related to abnormalities that can occur due to erroneous operations by the user are limited. Therefore, the storage unit 103 stores an event ID. The event ID indicates an event related to an abnormality that can occur due to an erroneous operation by the user. When the event ID included in the security log acquired by the log acquisition unit 101 is the same as the event ID stored in the storage unit 103, the false positive log determination unit 102 determines whether or not the security log is a false positive log. For a security log having an event ID related to an abnormality that is not likely to occur due to the erroneous operation by the user, the false positive log determination unit 102 does not perform the determination process as to whether or not the log is a false positive log. It may be possible to reduce the amount of processing related to log determination process.

Specifically, the false positive log determination unit 102 determines that the security log is a false positive log when the frequency with which the security log is generated is lower than the reference frequency stored in the storage unit 103.

Here, "lower" includes both cases where it contains the same value as the comparison target and cases where it does not.

In the example shown in FIG. 5, the storage unit 103 stores the time period (ten seconds, described as 10 sec in the drawings) and the number of times (three times) as the reference frequency of the security log of the event ID (A). This indicates that the number of security logs generated during the ten seconds is three times. The false positive log determination unit 102 determines whether or not the frequency with which the security logs are generated is less than three times in ten seconds.

Figure 6A:
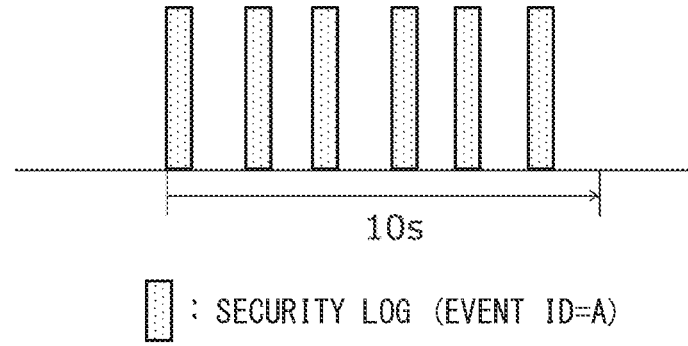
FIG. 6A is a diagram illustrating a method of determining whether or not a security log is a false positive log according to the first embodiment.

A process for determining whether or not a security log is a false positive log is described with reference to FIG. 6A and FIG. 6B. In the example shown in FIG. 6A, the security log is generated six times in ten seconds. The frequency is higher than the reference frequency. Therefore, none of the security logs shown in FIG. 6A are determined to be the false positive logs. By contrast, in the example shown in FIG. 6B, the security log is generated twice in ten seconds, which is lower than the reference frequency. Therefore, all the security logs shown in FIG. 6B are determined to be false positive logs.

Figure 6B:
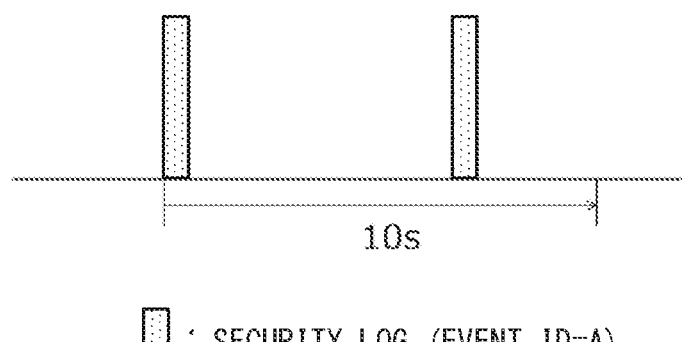
FIG. 6B is a diagram illustrating a method of determining whether or not a security log is a false positive log according to the first embodiment.

In the example shown in FIG. 6A and FIG. 6B, the frequency of security logs generated within ten seconds from the time when the first security log was generated is compared with the reference frequency. The frequency of the security logs is not limited to the frequency after the first security log is generated. For example, the frequency of security logs generated during ten seconds before the time when the last security log was generated may be compared with the reference frequency. Alternatively, the frequency of each security log generated within ten seconds from the time when each security log was generated may be calculated, and each frequency and the reference frequency may be compared.

Since the number of times a user repeats an erroneous operation is limited, the frequency of security logs being generated due to user erroneous operations may not be so high. By contrast, when the electronic control system S is subjected to, for example, a brute force attack or a DoS attack, it is assumed that security logs will be generated very frequently. Therefore, a reference frequency is set. When the frequency at which security logs are generated is lower than the reference frequency, the false positive log determining unit 102 determines that the security log is generated by a user's erroneous operation, that is, the false positive log.

In the present embodiment, the number of times a security log is generated within a predetermined period is described as the frequency at which a security log is generated. The present disclosure is not limited thereto. For example, a cycle in which a security log is generated may be used as the frequency. For example, since the speed at which the user performs an operation is limited, there is a possibility that the cycle of repeating an erroneous operation is not so short. By contrast, in a case where the electronic control system S is subjected to a brute force attack or a DoS attack by mechanical process, there may be a high possibility that the cycle at which the security log is generated becomes extremely short. Therefore, by using a cycle in which the security log is generated as a frequency, it may be determined whether or not the security log is a false positive log.

The storage unit 103 illustrated in FIG. 4 stores a table illustrated in FIG. 5, indicating a correspondence relationship between an event ID and a reference frequency. However, the storage unit 103 may store the event ID and the reference frequency in association with the ECU-ID. For example, the ECU 20a and the ECU 20c may generate security logs having the same event ID (A). In such a case, security logs generated in different ECUs are generated by detecting different abnormalities. Therefore, even if the security logs have the same event ID (A), there may be a possibility that one security log is generated when the security sensor detects an abnormality caused by an attack, and the other security log is generated when the security sensor detects an abnormality caused by an erroneous operation. Therefore, in addition to the event ID and the reference frequency, the storage unit 103 may store the ECU-ID in association with them.

The security logs acquired by the log acquisition unit 101 may include security logs having various event IDs. The security logs having different event IDs are logs generated by detecting different abnormalities. Therefore, the false positive log determination unit 102 determines whether or not the frequency at which the security log having the common event ID (in other words, the same event ID) is generated is lower than the reference frequency associated with the event ID stored in the storage unit 103, and determines whether or not the security log is a false positive log. When the ECU-ID (corresponding to device type information) is stored in the storage unit 103, the false positive log determination unit 102 determines whether or not the frequency of generation of a security log (corresponding to a common security log) having a common ECU-ID (in other words, the same ECU-ID) in addition to the common event ID is lower than the reference frequency associated with the event ID and the ECU-ID stored in the storage unit 103, and determines whether or not the security log is a false positive log.

The false positive information assignment unit 104 adds "false positive information", which is information for specifying a false positive log, to the security log based on the determination result output from the false positive log determination unit 102. When the determination result of the false positive log determination unit 102 is output and stored in a memory (not illustrated) such as a RAM, the false positive information assignment unit 104 adds the false positive information to the security log based on the determination result stored in the memory.

For example, the false positive information assignment unit 104 adds to the security log determined to be a false positive log by the false positive log determination unit 102 a flag indicating that the security log is a false positive log, as the false positive information. The false positive information may be given by being stored in the context data of the security log illustrated in FIG. 3, for example. By adding a flag as false positive information to a security log, it may be possible to easily distinguish between a security log generated by an attack and a security log generated by a user's erroneous operation.

Here, the term of false positive information may be information indicating that the security log is not a false positive, as well as information indicating that the security log is a false positive.

In the embodiment described below, the false positive information assigning unit 104 adds false positive information to a security log determined to be a false positive log. The false positive information assignment unit 104 may give the false positive information to the security log determined by the false positive log determination unit 102 not to be the false positive log. The false positive information in this case may indicate information indicating that the security log to which the information is added is not a false positive log.

The transmission unit 105 transmits a security log that is not determined to be a false positive log and a security log that is determined to be a false positive log. For example, the transmission unit 105 transmits the security log to an attack analysis device (not illustrated) that analyzes the security log. The attack analysis device that receives the security log determines whether or not the security log is a false positive log based on the false positive information added to the security log.

In the case of the log determination device 10 illustrated in FIG. 1A and FIG. 1B, the amount of communication between the vehicle and the attack analysis device may be reduced by transmitting only security logs that are not determined to be false positive logs to the attack analysis device (not illustrated) provided outside the vehicle. The transmission unit 105 may transmit only security logs that are not determined to be false positives.

In the present embodiment, a configuration in which the transmission unit 105 transmits the security log from the log determination device 10 is described. The transmission unit 105 may transmit the determination result by the false positive log determination unit 102 instead of or in addition to the security log.

When the security sensor 201 detects an abnormality caused by a user's erroneous operation and generates a security log, the erroneous operation frequency information acquisition unit 106 acquires erroneous operation frequency information indicating the frequency of the user's erroneous operation. The reference frequency stored in the storage unit 103 is updated based on the erroneous operation frequency information.

The frequency of erroneous operations tends to vary depending on the user. For example, the "user a" tends to perform twice or three erroneous operations within one minute, while another "user b" may perform ten or more erroneous operations within one minute. Therefore, the security log may be determined to be a false positive log for the "user a", but the security log may not be determined to be a false positive log for the "user b". Therefore, when the user performs an erroneous operation, it may be desirable to set the reference frequency according to a user by acquiring the erroneous operation frequency information and updating the reference frequency based on the frequency of the erroneous operation of the user.

(Operation of a Log Determination Device 10)

Figure 7:
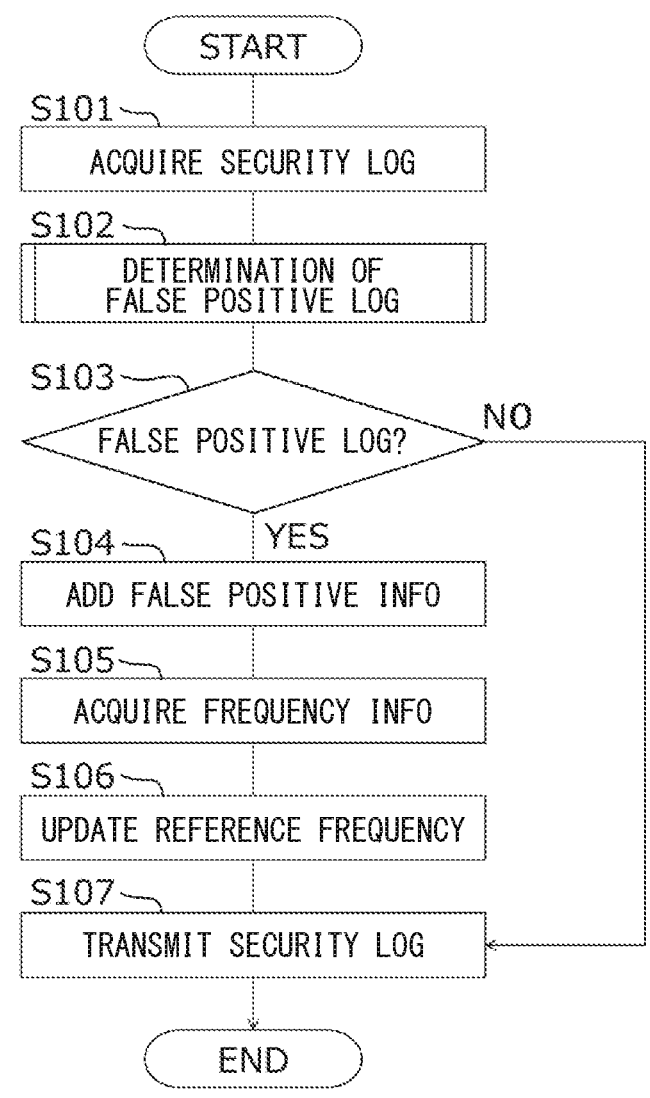
FIG. 7 is a diagram illustrating an operation of a log determination device according to each embodiment.
Figure 8:
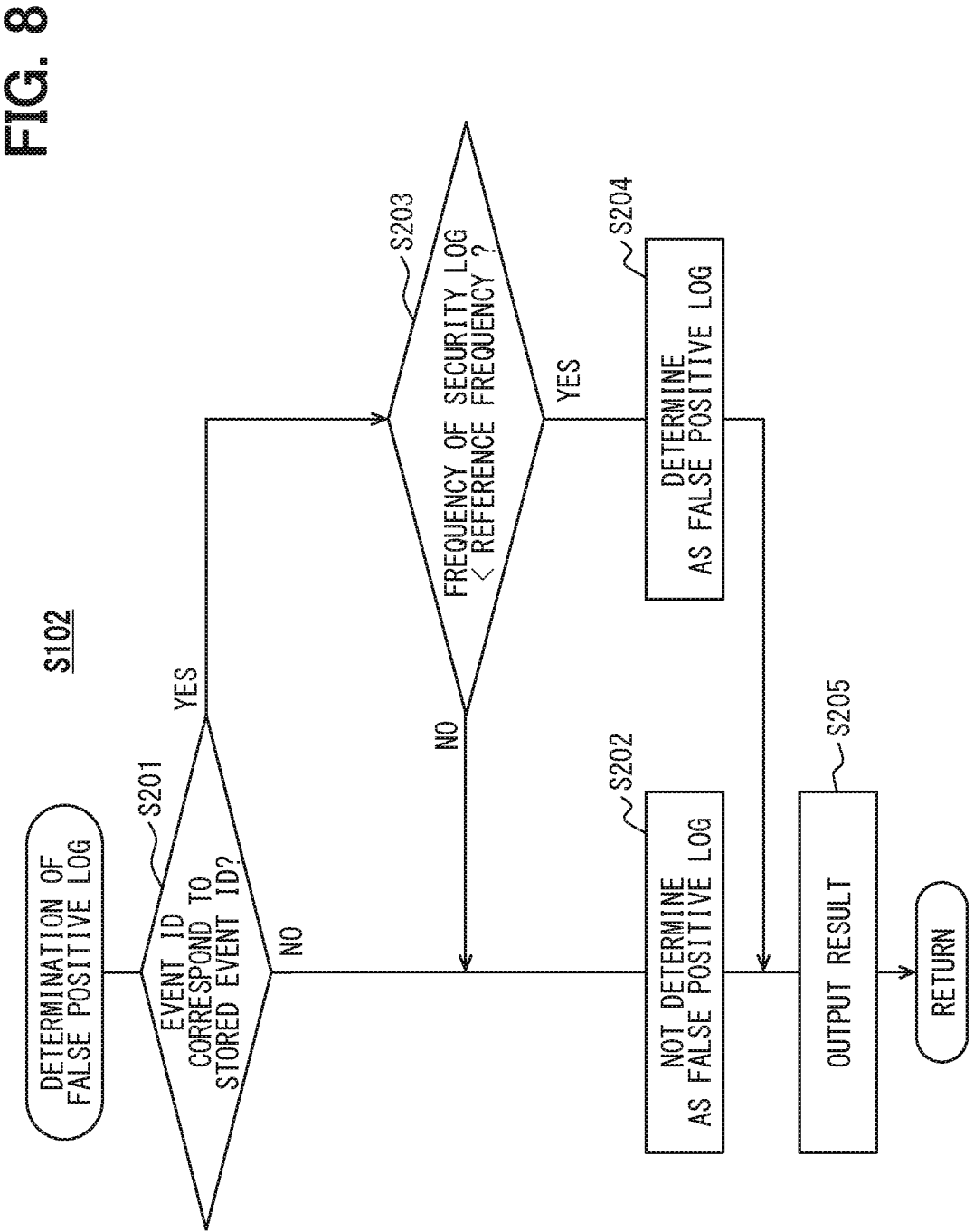
FIG. 8 is a diagram illustrating an operation of the log determination device according to the first embodiment.

The operation of the log determination device 10 is described with reference to FIG. 7 and FIG. 8. FIG. 7 and FIG. 8 illustrate not only a log determination method executed by the log determination device 10 but also a processing procedure of a log determination program executable by the log determination device 10. These processes are not limited to the order shown in FIG. 7 and FIG. 8. That is, the order may be changed as long as there is no restriction such as a relation in which a result of the preceding step is used in a certain step. The same applies to FIG. 12 of the second embodiment described later.

The log acquisition unit 101 acquires a security log generated when the security sensor 201 mounted on each of the multiple ECUs 20 configuring the electronic control system S detects an abnormality (S101).

The false positive log determination unit 102 determines whether or not the security log acquired in S101 is a false positive log (S102). Specifically, it is determined, based on the frequency at which the security log is generated, whether or not the security log is a false positive log. A specific flow of S102 is described below with reference to FIG. 8.

When it is determined in S102 that the security log is a false positive log (S103: Y), the false positive information assignment unit 104 adds false positive information to the security log determined to be the false positive log (S104).

The erroneous operation frequency information acquisition unit 106 acquires erroneous operation frequency information indicating the frequency of an erroneous operation by the user (S105).

The storage unit 103 updates the reference frequency based on the erroneous operation frequency information acquired in S105 (S106).

Next, the transmission unit 105 transmits a security log that is not determined to be a false positive log and transmits a security log that is determined to be a false positive log and to which false positive information is added (S107).

Next, with reference to FIG. 8, the process of determining whether or not the security log is a false positive log in S102 will be described.

The false positive log determination unit 102 determines whether or not the event ID included in the security log is the same as the event ID stored in the storage unit 103 (S201).

When the event ID included in the security log is different from the event ID stored in the storage unit 103 (S201: N), it is determined that the security log is not a false positive log (S202).

By contrast, when the event ID included in the security log is the same as the event ID stored in the storage unit 103 (S201: Y), the false positive log determination unit 102 further determines whether or not the frequency of the security log is lower than the reference frequency (S203).

When the frequency of the security log is lower than the reference frequency (S203: Y), the false positive log determination unit 102 determines that the security log is a false positive log (S204).

By contrast, when the frequency of the security log is higher than the reference frequency (S 203: N), the false positive log determination unit 102 determines that the security log is not a false positive log (S202).

The false positive log determination unit 102 outputs the determination result (S205).

As described above, according to the present embodiment, it may be possible to determine that a security log generated by a user's erroneous operation is a false positive log. A device that analyzes an attack with a security log can analyze an attack using a security log excluding a security log generated by a user's erroneous operation. It may be possible to improve the accuracy of analysis of an attack.

Furthermore, according to the present embodiment, by not transmitting the security log determined to be a false positive log, it may be possible to reduce the amount of communication between the log determination device and the attack analysis device.

Second Embodiment

In the present embodiment, a method of determining whether or not a security log is a false positive log using a method different from that in the first embodiment will be described. Since the configuration of the log determination device of the present embodiment is the same as that of the first embodiment, the present embodiment will be described with reference to the configuration diagram of FIG. 4.

(Configuration of the Log Determination Device 10)

The log acquisition unit 101 of the present embodiment acquires a security log (corresponding to a second security log) indicating that a predetermined event has succeeded in the electronic control system S, in addition to a security log (corresponding to a first security log) generated when the security sensor 201 detects an abnormality. Hereinafter, in order to distinguish between a security log generated when an abnormality is detected and a security log indicating that a predetermined event has succeeded, the security log is referred to as an abnormality security log and a success security log, respectively.

As in the first embodiment, the false positive log determination unit 102 determines a false positive log with information stored in the storage unit 103. FIG. 9 illustrates an example of a table stored in the storage unit 103 according to the present embodiment. The storage unit 103 illustrated in FIG. 9 stores a table indicating a correspondence relationship among the event ID, the reference frequency, and the event ID (referred to as a success event ID) of the success security log.

The success event ID stored in the storage unit 103 of the present embodiment is an event ID indicating identification information of an event that may be successful when a user performs a correct operation after an erroneous operation by the user of the electronic control system S. For example, it is conceivable that a correct password input or authentication operation is performed after an erroneous operation such as a user of a vehicle on which the electronic control system S is mounted erroneously inputting a password necessary for Wi-Fi (registered trademark) connection or an operator performing an erroneous authentication operation at a maintenance shop, or a dealer is performed. As described above, when input of a correct password or authentication operation is performed, a security log indicating that the event is successful is generated. Therefore, a success event ID indicating an event that may occur after the user's erroneous operation is stored in the storage unit 103. When the event ID included in the success security log acquired by the log acquisition unit 101 is the same as the success event ID stored in the storage unit 103, the false positive log determination unit 102 determines whether or not the abnormal security log is a false positive log based on the frequency at which the abnormal security log is generated before the success security log.

In the example of FIG. 9, the success event ID is associated with the event IDs (A) and (C), but the success event ID is not associated with the event ID (B). Depending on the type of the event, the security log of the success event may not be acquired, and thus the successful event ID is not associated with all the event IDs. Therefore, when a success event ID is not associated as in the event ID (B), it is determined whether or not the security log is a false positive log using the same method as in the first embodiment.

Figure 10A:
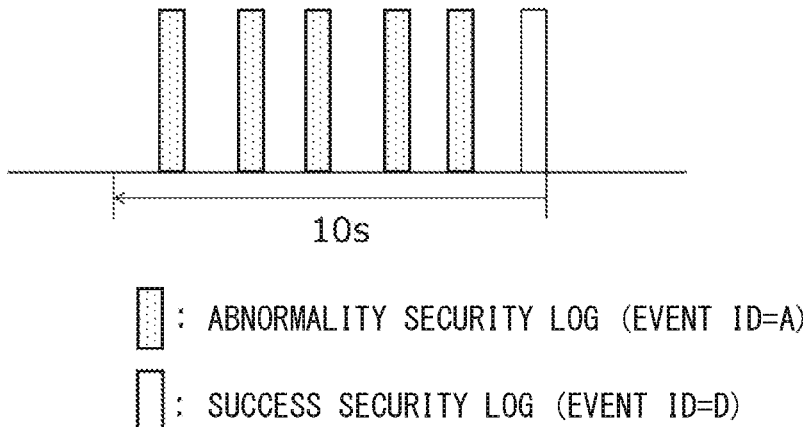
FIG. 10A is a diagram illustrating a method of determining whether or not a security log is a false positive log according to the second embodiment.
Figure 10B:
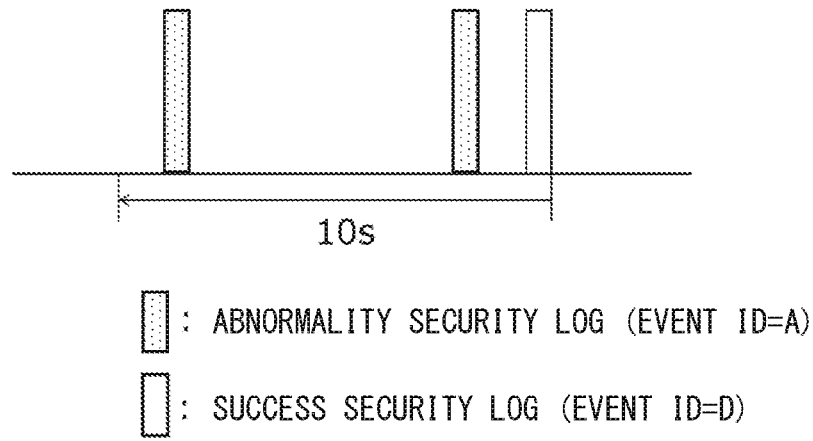
FIG. 10B is a diagram illustrating a method of determining whether or not a security log is a false positive log according to the second embodiment.

Processing for determining whether or not a security log is a false positive log according to the present embodiment will be described with reference to FIG. 10A and FIG. B. A shaded bar indicates an abnormal security log, and a white bar indicates a success security log. In the example illustrated in FIG. 10A, the abnormal security log having the event ID (A) is generated five times during ten seconds before the time when the success security log having the event ID (D) is generated, and the frequency is higher than the reference frequency. Therefore, none of the abnormal security logs illustrated in FIG. 10A is determined to be a false positive log. by contrast, in the example illustrated in FIG. 10B, the abnormal security log is generated twice during 10 seconds before the time when the success security log is generated, and the frequency is lower than the reference frequency. In this case, all of the abnormal security logs illustrated in FIG. 10B are determined to be false positive logs.

Even when the frequency of the abnormal security log is lower than the reference frequency, the false positive log determination unit 102 of the present embodiment may not determine that the abnormal security log generated immediately before the successful security log is a false positive log. It takes a certain amount of time for the user to perform the operation. Therefore, in a case where the success security log is generated immediately after the abnormality security log is generated, that is, in a case where the time from the occurrence of the abnormality to the occurrence of the success event is shorter than the time required for the user to perform the operation, there is a possibility that the abnormality has occurred not by the erroneous operation of the user but by the attack by the machine processing. Therefore, the false positive log determination unit 102 may not determine that an abnormal security log generated in a predetermined period before the time when the success security log is generated is a false positive log.

Figure 11:
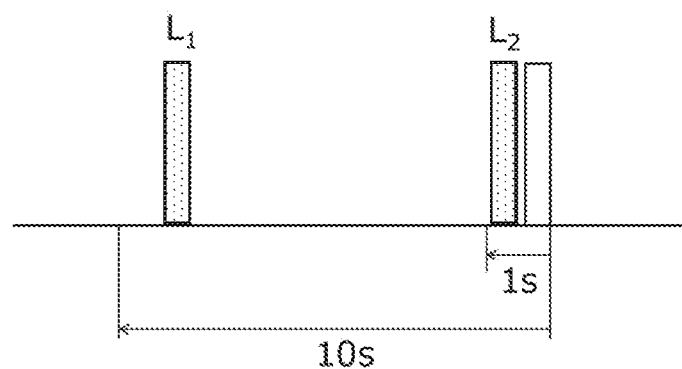
FIG. 11 is a diagram illustrating a method of determining whether or not a security log is a false positive log according to the second embodiment.

For example, in the example illustrated in FIG. 11, the abnormal security log is generated twice during ten seconds before the time when the success security log is generated, and the frequency thereof is lower than the reference frequency. However, in the example of FIG. 11, the abnormal security log is generated in a predetermined period (In FIG. 11, one second is shown.) before the time when the success security log is generated. Therefore, the log of L1 among the abnormal security logs is determined to be a false positive log, but the log of L2 is not determined to be a false positive log.

(Operation of Log Determination Device 10)

Figure 12:
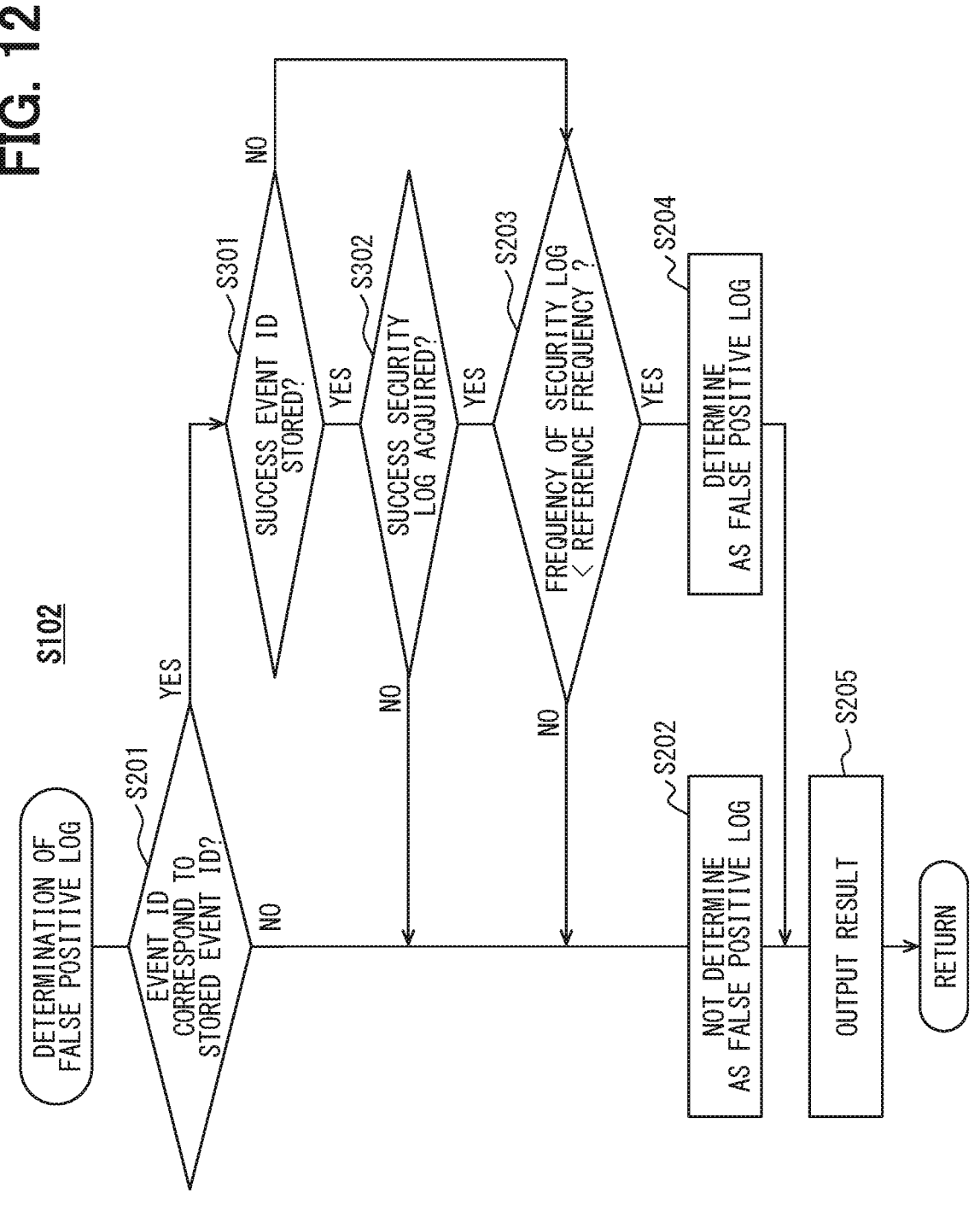
FIG. 12 is a diagram illustrating an operation of a log determination device according to the second embodiment.

The log determination device 10 according to the present embodiment executes each process illustrated in FIG. 7, similarly to the log determination device 10 according to the first embodiment. The log determination device 10 of the present embodiment is different from the first embodiment in the process of S102 in which it is determined whether or not the log is a false positive log. The process of determining whether or not the log is a false positive log according to the present embodiment will be described with reference to FIG. 12. In FIG. 12, processes that are common to FIG. 8 are marked with the same reference numerals as in FIG. 8.

The false positive log determination unit 102 determines whether or not the event ID included in the security log is the same as the event ID stored in the storage unit 103 (S201).

When the event ID included in the security log is different from the event ID stored in the storage unit 103 (S201: N), it is determined that the security log is not a false positive log (S202).

By contrast, when the event ID included in the security log is the same as the event ID stored in the storage unit 103 (S201: Y), the false positive log determination unit 102 further determines whether or not the success event ID associated with the event ID is stored in the storage unit 103 (S301).

When the storage unit 103 stores the success event ID associated with the event ID (S301: Y), it is further determined whether or not the log acquisition unit 101 has acquired a success security log having the success event ID (S302).

When the log acquisition unit 101 acquires the success security log, it is determined whether the frequency of the abnormal security log generated before the success security log is lower than the reference frequency (S203).

When the frequency of the security log is lower than the reference frequency (S203: Y), the false positive log determination unit 102 determines that the security log is a false positive log (S204).

When the frequency of the security log is higher than the reference frequency (S203: N), the false positive log determination unit 102 determines that the security log is not a false positive log (S204).

On the other hand, when the successful event ID associated with the event ID is not stored in the storage unit 103 in S 301 (S 301: N), it is determined whether or not the frequency of the abnormal security log is lower than the reference frequency as in Embodiment 1 (S 203).

The false positive log determination unit 102 outputs the determination result (S205).

As described above, according to the present embodiment, by using a security log indicating that an event has succeeded, it may be possible to determine a security log generated by a user's erroneous operation as a false positive log with higher accuracy.

The features of the log determination device and the like in each embodiment of the present invention have been described above.

Terms used in the description of each embodiment are examples and may be replaced with synonymous terms or terms having a synonymous function.

The block diagrams used for the description of the embodiments are obtained by classifying and organizing the configurations of the devices for each function. The blocks representing the respective functions may be implemented by any combination of hardware or software. Since the blocks represent the functions, such a block diagram may also be understood as disclosures of a method and a program for implementing the method.

An order of functional blocks that can be understood as processes, flows, and methods described in the embodiments may be changed as long as there are no restrictions such as a relation in which results of preceding steps are used in one other step.

The terms such as first, second, to N-th (where N is an integer) used in each embodiment are used to distinguish two or more configurations and methods of the same kind and are not intended to limit the order or superiority.

It is assumed that each embodiment is based on a log determination device for a vehicle for determining a security log generated by a security sensor of an electronic control device mounted on a vehicle. The present disclosure may include a dedicated or general-purpose device other than those for vehicles.

Examples of the form of the log determination device of the present disclosure include the following.

Examples of a form of a component include a semiconductor device, an electronic circuit, a module, and a microcomputer.

Examples of a form of a semi-finished product include an electric control unit (ECU) and a system board.

Examples of a form of a finished product include a cellular phone, a smartphone, a tablet computer, a personal computer (PC), a workstation, and a server.

In addition, the devices may include a device having a communication function or the like, and examples thereof include a video camera, a still camera, and a car navigation system.

Necessary functions such as an antenna and a communication interface may be added to the log determination device.

The log determination device of the present disclosure is assumed to be used for the purpose of providing various services by being used particularly on the server side. When such a service is provided, the log determination apparatus of the present disclosure is used, the method of the present disclosure is used, or/and the program of the present disclosure is executed.

In addition, the present disclosure may be implemented by not only dedicated hardware having the configurations and functions described in each embodiment but also as a combination of a program recorded in a recording medium such as a memory or a hard disk and provided to implement the present disclosure, and general-purpose hardware having a dedicated or general-purpose CPU, which can execute the program, and having a memory and the like.

A program stored in a non-transitory computer readable storage medium (for example, an external storage device (a hard disk, a USB memory, and a CD/BD) of dedicated or general-purpose hardware, or an internal storage device (a RAM, a ROM, and the like)) may also be provided to dedicated or general-purpose hardware via the recording medium or from a server via a communication line without using the recording medium. Consequently, as the program is upgraded, the corresponding latest function can be always provided.

The log determination device of the present disclosure is mainly intended for a device that determines a security log generated by a security sensor of an electronic control device mounted on an electronic control system mounted on an automobile but may be intended for a device that analyzes a log generated by other system or device not mounted on an automobile.

The present disclosure can be realized in various forms such as a program. The program may be stored in a computer-readable, non-transitory computer readable storage medium as instructions to be executed by a computer. For example, the program may be stored in a flash memory, ROM, or the like.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a non-transitory computer-readable storage medium.

Here, the process of the flowchart or the flowchart described in this application includes a plurality of sections (or steps), and each section is expressed as, for example, S101. Further, each section may be divided into several subsections, while several sections may be combined into one section. Furthermore, each section thus configured may be referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A log determination device comprising:
a computer including a processor and memory storing a program causing the processor to perform:
acquiring a set of security logs each generated upon detecting an abnormality in an electronic control system, the abnormality having a type of a plurality of types, the electronic control system being mounted on a vehicle and configured to detect the abnormality, wherein a respective security log includes abnormality type information indicating the type among the plurality of types of the detected abnormality and detection time information indicating when the detected abnormality was detected;
specifying a specific security log from among the acquired set of security logs based on the abnormality type information, the specific security log indicating that the abnormality of a given type among the plurality of types is detected;
specifying a frequency of generation of the specific security log based on the detection time information;
determining, based on the frequency of generation of the specific security log indicating the abnormality of the given type is detected in the electronic control system, whether or not the specific security log is a false positive log, wherein the false positive log is the security log generated by detecting the abnormality caused not by the electronic control system being attacked;

generating false positive log information indicative of the security log that is determined as the false positive log among the acquired set of security logs; and outputting the generated false positive log information to analyze an attack on the electronic control system mounted on the vehicle and to take a countermeasure against the attack based on the analyzing.

2. The log determination device according to claim 1, wherein:

the computer includes a storage configured to store a reference frequency serving as a reference for determining whether the specific security log is the false positive log; and in a case where the frequency is lower than the reference frequency, the specific security log is determined to be the false positive log.

3. The log determination device according to claim 2, wherein the program further causes the processor to perform:

acquiring an erroneous operation frequency information indicating a frequency of an erroneous operation by a user of the electronic control system, wherein:

the erroneous operation frequency information is acquired in a case where the specific security log is generated by detecting an abnormality caused by the erroneous operation by the user; and the reference frequency is updated based on the erroneous operation frequency information.

4. The log determination device according to claim 1, wherein:

each security log of the set of security logs includes event type information indicating an event related to the abnormality detected in the electronic control system;

the computer includes a storage configured to store an erroneous operation event type information indicating the event related to the abnormality caused by an erroneous operation by a user of the electronic control system among the event type information; and in a case where the event type information in the specific security log is same as the erroneous operation event type information, the program further causes the processor to determine whether the specific security log is the false positive log.

5. The log determination device according to claim 1, wherein:

each security log of the set of security logs includes an event type information indicating an event related to the abnormality detected in the electronic control system and a device type information indicating an electronic control unit that detects the abnormality among a plurality of electronic control units that constitutes the electronic control system, common security logs are security logs to which the event type information and the device type information are common; and the program further causes the processor to determine whether the common security logs are false positive logs, based on a frequency of generation of the common security logs among security logs.

6. The log determination device according to claim 1, wherein the program further causes the processor to perform:

acquiring a first security log, which is the specific security log, and a second security log that is a security log indicating success of a certain event in the electronic control system; and determining whether or not the first security log is the false positive log, based on a frequency of generation of the first security log before a time when the second security log has been generated.

7. The log determination device according to claim 6, wherein:

the program further causes the program to not determine that the first security log generated during a predetermined period prior to a time when the second security log is generated is the false positive log.

8. The log determination device according to claim 1, wherein the program further causes the processor to perform:

adding false positive information identifying the false positive log to the specific security log based on the determination result; and transmitting the specific security log to which the false positive information is added.

9. The log determination device according to claim 1, wherein:

the log determination device is provided outside the vehicle.

10. The log determination device according to claim 1, wherein:

the log determination device is mounted on the vehicle.

11. A log determination method executable by a log determination device, comprising:

acquiring a set of security logs each generated upon detecting an abnormality in an electronic control system, the abnormality having a type of a plurality of types, the electronic control system being mounted on a vehicle and configured to detect the abnormality, wherein a respective security log includes abnormality type information indicating the type among the plurality of types of the detected abnormality and detection time information indicating when the detected abnormality was detected;

specifying a specific security log from among the acquired set of security logs based on the abnormality type information, the specific security log indicating that the abnormality of a given type among the plurality of types is detected;

specifying a frequency of generation of the specific security log based on the detection time information;

determining, based on the frequency of generation of the specific security log indicating the abnormality of the given type is detected in the electronic control system, whether or not the specific security log is a false positive log, the false positive log being the security log generated by detecting the abnormality caused not by the electronic control system being attacked;

generating false positive log information indicative of the security log that is determined as the false positive log among the acquired set of security logs; and outputting the generated false positive log information to analyze an attack on the electronic control system mounted on the vehicle and to take a countermeasure against the attack based on the analyzing.

12. A non-transitory computer-readable storage medium storing a log determination program executable by a log determination device having a computer including a processor, the program comprising instructions that cause the processor to perform:

acquiring a set of security logs each generated upon detecting an abnormality in an electronic control system the abnormality having a type of a plurality of types, the electronic control system being mounted on a vehicle and configured to detect the abnormality, wherein a respective security log includes abnormality type information indicating the type among the plurality of types of the detected abnormality and detection time information indicating when the detected abnormality was detected;

specifying a specific security log from among the acquired set of security logs based on the abnormality type information, the specific security log indicating that the abnormality of a given type among the plurality of types is detected;

specifying a frequency of generation of the specific security log based on the detection time information;

determining, based on the frequency of generation of the specific security log indicating the abnormality of the given type is detected in the electronic control system, whether or not the specific security log is a false positive log, the false positive log being the security log generated by detecting the abnormality caused not by the electronic control system being attacked;

generating false positive log information indicative of the security log that is determined as the false positive log among the acquired set of security logs; and outputting the generated false positive log information to analyze an attack on the electronic control system mounted on the vehicle and to take a countermeasure against the attack based on the analyzing.

13. A log determination system comprising:

an electronic control system having a first computer including a first processor and a first memory storing a first program; and a log determination device having a second computer including a second processor and a second memory storing a second program;

wherein:

the first program causes the first processor to:

generate a set of security logs each generated upon detecting an abnormality in the electronic control system, the abnormality having a type of a plurality of types, the electronic control system being mounted on a vehicle and configured to detect the abnormality, wherein a respective security log includes abnormality type information indicating the type among the plurality of types of the detected abnormality and detection time information indicating when the detected abnormality was detected; and transmit the set of security logs to the log determination device; and the second program causes the second processor to:

acquire the set of security logs transmitted from the first processor;

specify a specific security log from among the acquired set of security logs based on the abnormality type information, the specific security log indicating that the abnormality of a given type among the plurality of types is detected;

specify a frequency of generation of the specific security log based on the detection time information;

determine, based on the frequency of generation of the specific security log indicating the abnormality of the given type is detected in the electronic control system, whether or not the specific security log is a false positive log, wherein the false positive log is the security log generated by detecting the abnormality caused not by the electronic control system being attacked;

generate false positive log information indicative of the security log that is determined as the false positive log among the acquired set of security logs; and output the generated false positive log information to analyze an attack on the electronic control system mounted on the vehicle and to take a countermeasure against the attack based on the analyzing.

* * * * *